Patented Oct. 16, 1951

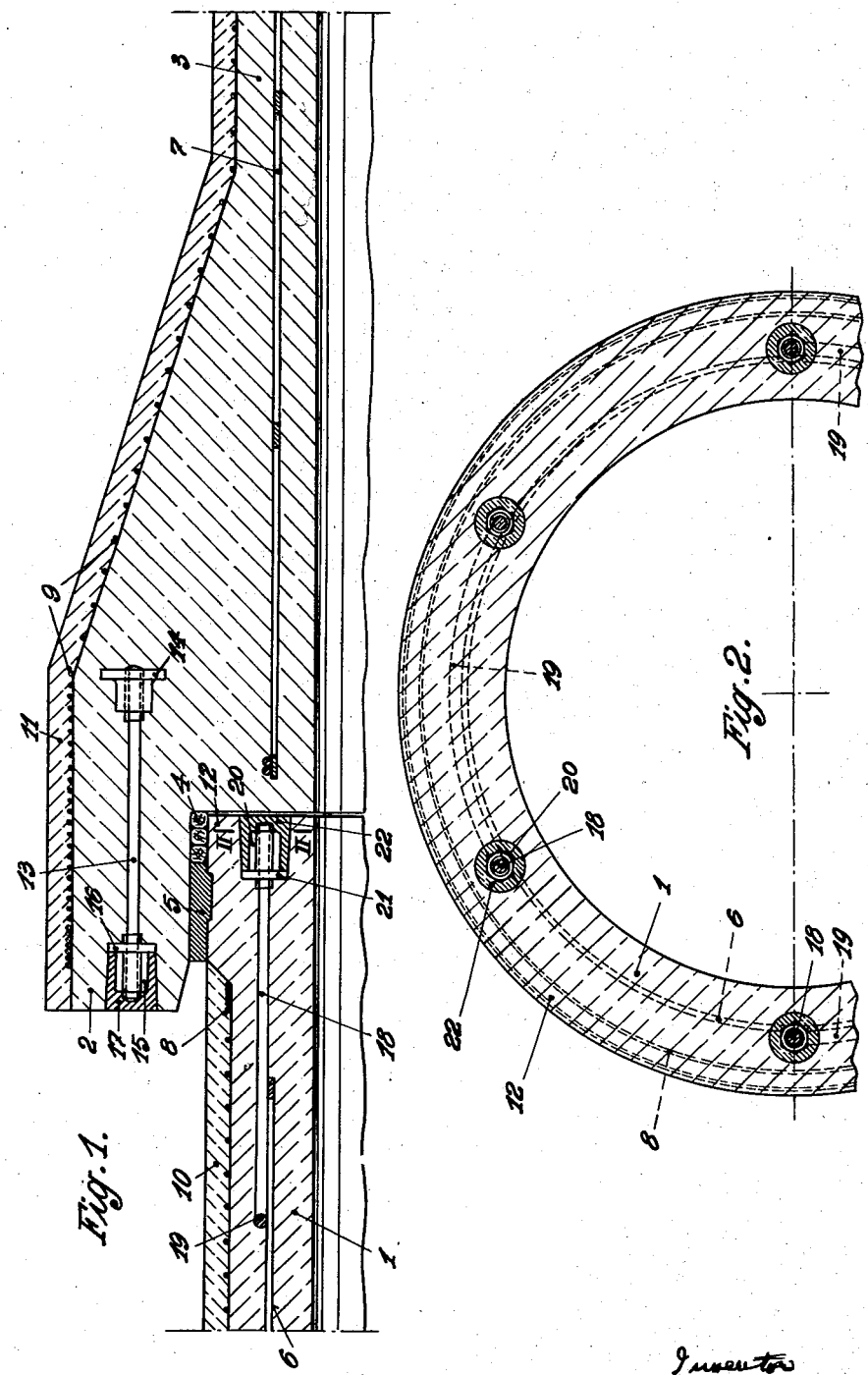

2,571,578

UNITED STATES PATENT OFFICE 2,571,578

HOLLOW ARTICLE OF CONCRETE AND THE LIKE

Christian Marie Corneille Janssens van der Maelen, Crainhem, Belgium, assignor to Société Continentale et Coloniale de Construction, Société Anonyme, Brussels, Belgium Application February 4, 1946, Serial No. 645,395
In Belgium March 1, 1943

Section 1, Public Law 690, August 8, 1946
Patent expires March 1, 1963

2 Claims. (Cl. 138—84)

In the manufacture of hollow articles of reinforced concrete or the like, such as pipes adapted to convey fluids under pressure, it is known to increase the resistance of these articles by the provision of a transverse reinforcement placed under initial tension, the armature being capable of being constituted, for example, by a continuous hoop formed by a metal wire, for example of high resistance steel, wound in helical form, or by a discontinuous hoop formed by spaced rings.

This tensioned transverse reinforcement may create dangerous tensions at the ends of the pipes or other hollow bodies, and thus produce the formation of fissures or cracks in these ends, or even the splitting of the latter. This is particularly the case in connection with a jointing bell mouth or sleeve, where the hooping of the sleeve may produce cracks at the base of the sleeve. A similar danger exists at the straight end of a pipe provided with a transverse reinforcing hoop which ends at a predetermined distance from the end of the tube, which is particularly the case of pipes with a monolith end, which have the advantage of avoiding leakages between the outer wall of the pipe core on which the hoop is located, and the covering layer of the hoop.

For the purpose of obviating these disadvantages the invention provides a method for reinforcing the ends of hollow articles, such as pipes, of reinforced concrete, or the like, subjected to dangerous tensions created by a transverse reinforcement placed under initial tension, which method consists essentially in creating a longitudinal pre-constraining force on the concrete or the like, throughout the entire zone subjected to dangerous tensions, by means of reinforcing elements anchored on opposite sides of this zone and placed under initial tension. All kinds of reinforcing elements may be used and their anchoring ensured by any suitable means. Use is made with advantage of metal rods, for example of high resistance steel, which are anchored in the mass of the pipe or the like, beyond the dangerous zone, for example by means of an anchoring head fixed or screwed to the end of each rod, and which are placed under tension by tightening, at their other end, a nut bearing, preferably through the medium of a washer, against the mass of the pipe or the like. Each tightening nut is preferably lodged in a cavity provided in the end face of the hollow body, this cavity being then filled with cement or other material. Instead of providing the rods with an individual anchorage, each pair of rods may be replaced by a U-shaped strap, of which the base forms the anchorage whilst the end of each limb receives a tightening bolt. Or the anchoring bars may, at one of their ends, be secured or hooped either all to the same anchoring ring or in groups to a number of anchoring ring segments.

By way of demonstration, a method of construction of the invention will be described hereinafter with reference to the accompanying drawing, wherein:

Fig. 1 shows a partial view in longitudinal section of a socket pipe joint, and

Fig. 2 shows a partial sectional view on the line II—II of Fig. 1.

In the drawing, 1 indicates a section of a straight pipe, engaging with the end bell or sleeve 2 of a pipe 3, the fluid tightness of the joint being ensured by any suitable means, for example, hemp cords 4 and a ring of soft lead 5. The pipes 1 and 3 are provided with a longitudinal reinforcement 6, 7, for example of expanded metal, and a transverse reinforcement of hooping 8, 9 which is formed of a steel wire wound in helical form and under tension, and is covered by a lining layer 10, 11.

The hoop 8 stops at a predetermined distance from the end of the pipe 1 which is terminated by a monolith end 12 in order to avoid the danger of leakage of fluid under pressure conveyed by the piping, between the outer surface of the pipe core on which the hoop is wound, and the lining layer 10. As the hoop stops at a predetermined distance from the end of the pipe, dangerous tensions are always produced in the monolith end 12 which tends to open and is liable to burst before its junction with another tube.

However the tension of the part of the hoop 9 applied to the bell 2 of the pipe 3, tends to crush the bell whilst producing cracks at its base, before its junction with another tube.

To obviate this danger, the invention provides the placing under preconstraint of the mass exposed to dangerous tensions. In the bell 2 this preconstraint is obtained by means of cramps 13 anchored individually in the concrete or the like, for example by means of a flange 14 screwed or otherwise fixed to the cramp 13. This is placed under tension by the tightening of a nut 15 which bears against the mass of the pipe by means of a washer 16 placed in the bottom of a cavity 17 which is provided in this mass and is then filled with cement or other filling material. In order not to weaken the section of the cramp, its ends are screw threaded in relief. As shown in the pipe 1, the preconstraining elements may be formed by straps of U-shape of which the limbs 18 act in the same way as the cramps 13 and of which the anchorage is ensured by the base 19, preferably bent parallel to the wall of the pipe 1. As in connection with the cramps 13, the tension is obtained by tightening the nuts 20 bearing against the washers 21 located in the cavities 22.

The cramps or similar preconstraining elements may be embedded in the mass of concrete or the like before its setting and be placed under tension after the hardening of the concrete but before placing in position the transverse hooping reinforcement.

What I claim is:

1. A concrete conduit comprising opposing end sections and an intermediate section, longitudinal unstressed reinforcements in said intermediate section, transverse reinforcement means on said conduit and extending substantially the entire length thereof and short prestressed rod elements entirely disposed longitudinally within each of the end sections and anchored at their opposing ends to the end sections.

2. A concrete conduit including opposing end sections and a section intermediate said end sections, longitudinal unstressed reinforcements in said intermediate section, transverse reinforcement means in said conduit and extending substantially the entire length thereof and short prestressed rod elements entirely disposed longitudinally in each of the end sections, said rod elements having their inner ends anchored relative to the end sections and having their outer ends disposed in cavities formed in the outer ends of the end sections and nuts threaded on the outer ends of the rod elements.

CHRISTIAN MARIE CORNEILLE
JANSSENS van der MAELEN.

REFERENCES CITED

The following references are of record in the file of this patent:

UNITED STATES PATENTS

| Number | Name | Date |
|---|---|---|
| 903,909 | Steiner | Nov. 17, 1908 |
| 1,684,663 | Dill | Sept. 18, 1928 |
| 2,216,896 | Trickey | Oct. 8, 1940 |
| 2,236,107 | Miller et al. | Mar. 25, 1941 |